Jan. 6, 1948. G. MUIR ET AL 2,434,220
LOBSTER BAIT
Filed March 19, 1946

INVENTOR.
George Muir
BY Otto L. Schleicher
J. Stanley Churchill
Atty.

Patented Jan. 6, 1948

2,434,220

UNITED STATES PATENT OFFICE 2,434,220

LOBSTER BAIT

George Muir, Cohasset, and Otto L. Schleicher, Boston, Mass.

Application March 19, 1946, Serial No. 655,489

6 Claims. (Cl. 99—3)

This invention relates to a prepared lobster bait.

The object of the invention is to provide a prepared lobster bait which may be economically manufactured, is convenient and clean to handle during shipment and during its use in baiting lobster traps or pots, which remains effective as a bait and lure for relatively long periods of time, and in addition which exerts a more powerful attraction for lobsters than the natural bait heretofore employed.

With this general object in view and such others as may hereinafter appear the invention consists in the prepared lobster bait hereinafter described and particularly defined in the claims at the end of this specification.

As far as we are aware artificial or prepared baits for use by lobster fishermen have not gone into commercial use, and at the present time the lobster fishermen still continue to bait lobster traps or pots with natural bait comprising waste fish products. This natural lobster bait is at present handled in bulk form, being usually shipped in barrels and deposited in loose form in the lobster pot by the fishermen. The task of baiting lobster pots is accordingly disagreeable and inconvenient.

The present invention contemplates a novel artificial or prepared lobster bait which overcomes the difficulties which are inherent in the use of natural bait, and which in addition exerts a more powerful attraction and lure for the lobsters to the end that more lobsters may be caught on the average than with natural bait. In general the present bait comprises a mixture of an oil either vegetable or fish oil, or a combination of both, and a substantial quantity of ammonia preferably in liquid form. The oils are preferably emulsified and the ammonia incorporated as aqua ammonia preferably during emulsification. The emulsified oil-ammonia composition is preferably incorporated into an absorbent inert carrier comprising preferably a granular mixture of carbon and sawdust, and the latter is then enclosed within a container which is either perforate or in which provision is made for enabling the fishermen to perforate it so that when the lobster pot is baited with a container containing the prepared bait the natural movement of sea water at the bottom of the ocean effects a gradual leaching of the oil and ammonia in the form of a streak trailing from the lobster pot. The oil comprises a natural lure for the lobsters, and in addition experience has shown that the ammonia exerts an influence on the nervous reaction of the lobster causing it to follow the streak and enter the lobster pot or trap.

Figure 1:
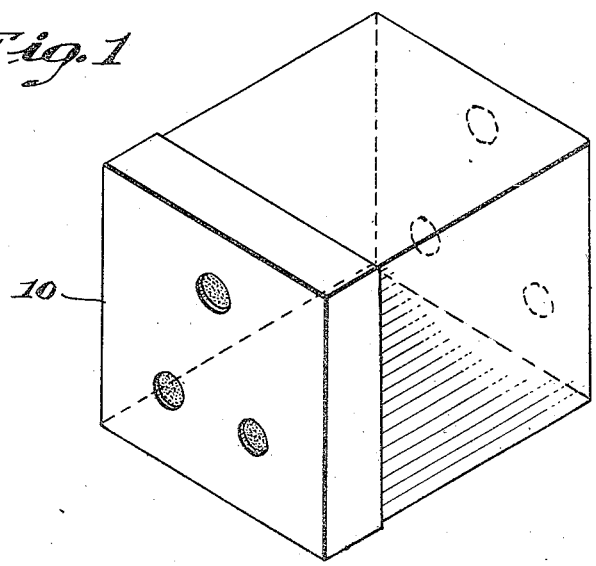
Figure 2:
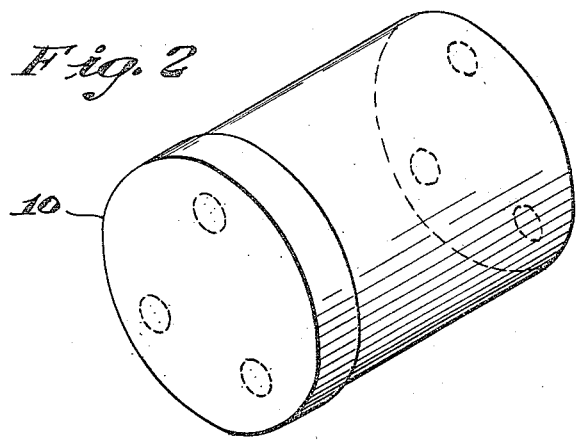

Referring to the drawing, 10 represents a container which may be of a fibrous nature enclosing a sufficient quantity of the prepared lobster bait to last for one, two or several days depending upon the bulk and oil content thereof. The container may be perforate as shown in Fig. 1, or it may have provision for enabling the lobster fishermen to conveniently perforate it as shown in Fig. 2. In some instances the container may comprise a close mesh bag but preferably a waxed fibrous container such as is shown in Fig. 2 is recommended. The size of the perforations is regulated so that the correct rate of effusion of the oil and ammonia content will occur to form a streak of the desired size leading from the lobster pot. In practice a container cylindrical in form and of a size such as to contain approximately one-half pint of the bait would suffice for from one to two days fishing. From our experience we have found that perforations at opposite ends of the container should be provided approximating in size the sectional dimensions of a pencil in order to permit an oil-ammonia streak of the desired quantity to be formed by the natural effect of the water.

In practice we may use any of the commercially available vegetable oils such as cottonseed oil, peanut oil, palm oil, linseed oil or any of the fish oils but preferably menhaden or pogy oil is used on account of the fact that it is commercially obtainable in quantity and is relatively less expensive than some of the other fish and vegetable oils. In producing the present bait the proportions of oil to aqua ammonia are preferably within the following ranges:

From one part by volume of ammonia to four to twelve parts by volume of oil.

As above set forth it is preferred to emulsify the oil and to incorporate the ammonia in the oil during emulsification. Any of the commercially available emulsifying agents may be employed, and we have experienced good results utilizing triethanolamine, although other agents may be used if found desirable such as ammonium linoleate, and diglycololeate.

For most purposes we prefer to utilize the oil-ammonia composition in an absorbent medium such as a granular mixture of carbon in the form of charcoal and sawdust. The emulsified oil is mixed up with the carrier comprising carbon and sawdust the carrier becoming impregnated with and acting to control the effusion to effect the slow dispersion of a relatively large amount of the oil and ammonia. In practice the varying proportions of carbon and sawdust to oil may be used up to the saturation of the carrier with the oil-ammonia composition.

Figure 3:
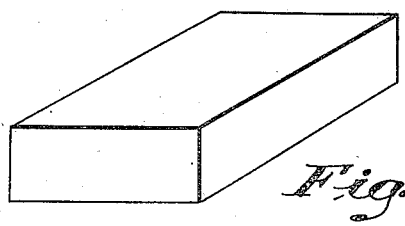

In order to handle the bait in its oily condition we prefer to enclose the same within a container such as a fibrous container, and the fibrous container may be perforated as shown in Fig. 1, or preferably provided with indents through which the fishermen may pass a pointed instrument to provide perforations at the time that the pot is to be baited. For some purposes it may be sufficient to enclose the oily carrier mass in a soluble gelatine or other solidifying medium forming a cake such as is shown in Fig. 3.

From the description thus far it will be observed that the present prepared bait, preferably in the form of a package, lends itself to economical production and convenient use by the fishermen. The task of baiting the lobster pot is simplified and the disagreeable features attending the use of natural bait are avoided. The weight of the carrier assists in holding the package and bait at the bottom of the trap when the latter is submerged in the ocean so that the streak of oil and ammonia emerging from the bait leads the lobster to the opening in the trap. The effect of the oil-ammonia appears to be particularly powerful and experience has shown that traps baited with the present lobster bait containing the oil-ammonia were far more successful than other traps disposed in the immediate vicinity and baited with natural bait.

While liquid ammonia may be used as above set forth, for some purposes ammonium salts such as salmoniac may be used advantageously instead of the liquid amonia and appear to have the same effect in producing an oil-ammonia streak of a nature which serves to lead the lobster to the opening in a trap baited with the same.

It will be understood that as used throughout the claims reference to a substantial quantity of ammonia shall include ammonium salts as well as liquid ammonia.

Having thus described the invention, what is claimed is:

1. A lobster bait comprising an inert absorbent carrier impregnated with an oil selected from the group consisting of vegetable and fish oils and containing a substantial quantity of liquid ammonia.

2. A lobster bait comprising an inert absorbent carrier impregnated with an oily mixture of ammonia and an emulsified oil selected from the group consisting of vegetable and fish oils.

3. A lobster bait comprising a granular mixture of carbon and sawdust impregnated with an oil selected from the group consisting of vegetable and fish oils and containing a substantial quantity of ammonia.

4. A lobster bait comprising a granular mixture of carbon and sawdust impregnated with an emulsified oil selected from the group consisting of vegetable and fish oils and containing a substantial quantity of ammonia.

5. A lobster bait comprising an oil selected from the group consisting of vegetable and fish oils and containing a substantial quantity of liquid ammonia.

6. A lobster bait comprising an emulsified oil selected from the group consisting of vegetable and fish oils and containing a substantial quantity of liquid ammonia.

GEORGE MUIR.
OTTO L. SCHLEICHER.

REFERENCES CITED

The following references are of record in the file of this patent:

UNITED STATES PATENTS

| Number | Name | Date |
|---|---|---|
| 871,486 | Debroisse | Nov. 19, 1907 |
| 1,185,894 | Evans | June 6, 1916 |
| 1,291,614 | Nixon | Jan. 14, 1919 |
| 1,366,509 | Thiessen | Jan. 25, 1921 |